UNITED STATES PATENT OFFICE.

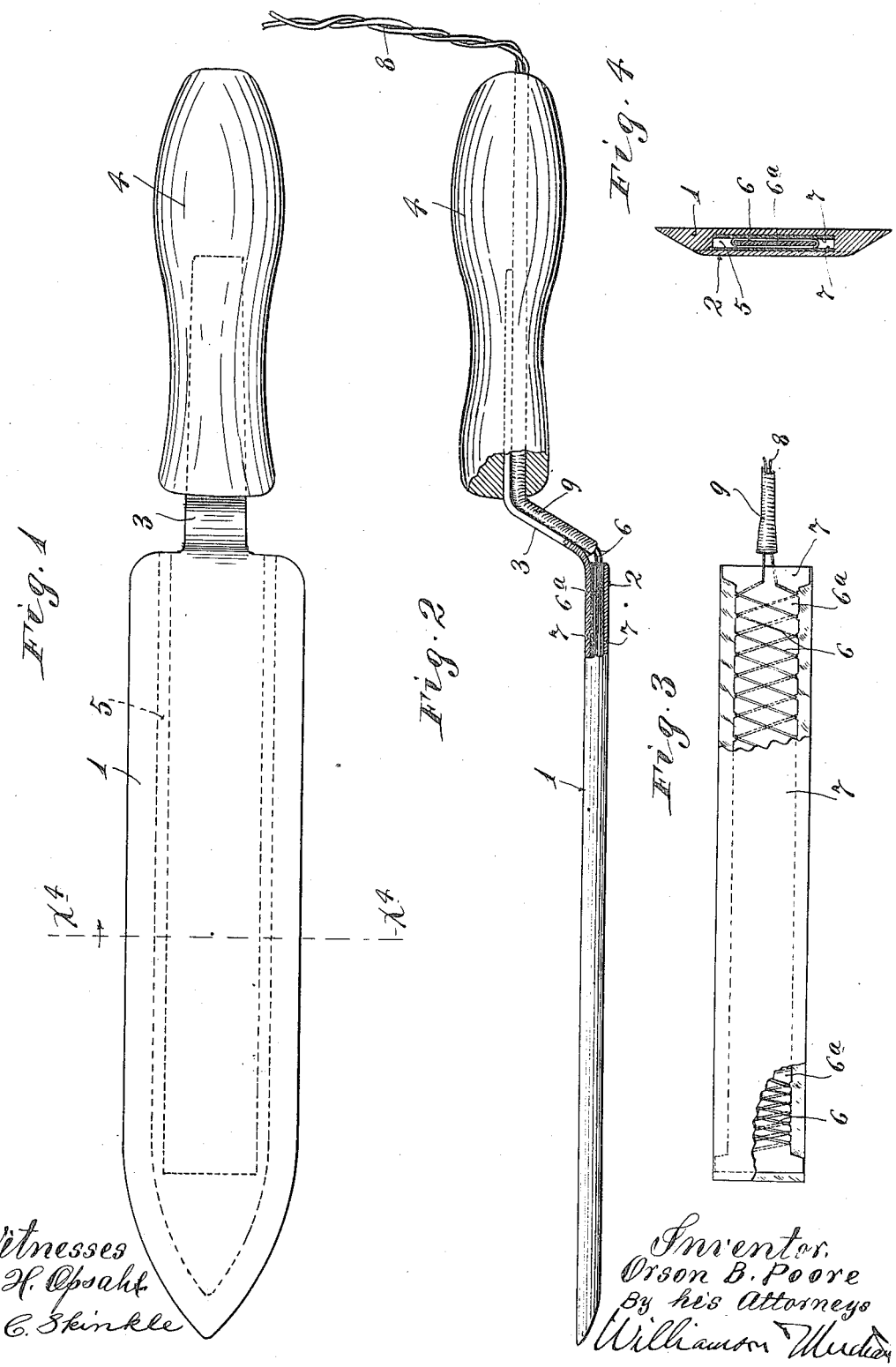

ORSON B. POORE, OF AURORA, MINNESOTA.

HONEYCOMB-DECAPPING KNIFE.

1,160,754. Specification of Letters Patent. Patented Nov. 16, 1915.

Application filed November 1, 1913. Serial No. 798,682.

*To all whom it may concern:*

Be it known that I, ORSON B. POORE, a citizen of the United States, residing at Aurora, in the county of St. Louis and State of Minnesota, have invented certain new and useful Improvements in Honeycomb-Decapping Knives; and I do hereby declare the following to be a full, clear, and exact description of the invention, such as will enable others skilled in the art to which it appertains to make and use the same.

My invention has for its object to provide an efficient electrically heated honey comb decapping knife, and to such ends, the invention consists of the novel construction and arrangement of parts hereinafter described and defined in the claim.

As is well known, a honey comb decapping knife will properly cut a honey comb only when hot, for when it is cold, the honey will stick thereto and cause the knife to break the comb. To do good work, the knife should be kept at an even temperature of the proper degree. This I have found that I can accomplish by the use of an electrical heater extending longitudinally through and set into the body of the knife.

In the accompanying drawings which illustrate the invention, like characters indicate like parts throughout the several views.

Referring to the drawings, Figure 1 is a plan view of the improved decapping knife; Fig. 2 is a side elevation thereof, with some parts broken away; Fig. 3 is a plan view with some parts broken away, showing the electrical heater removed from the knife blade; and Fig. 4 is a section taken on the line $x^4$ $x^4$ on Fig. 1.

The blade 1 of the knife is quite thick and is formed with flat parallel faces and is beveled on both sides and around the point so as to form a sharp cutting edge, which edge is best shown in Fig. 4. When the blade is thus formed it is provided with one flat face that is considerably wider than the other. The narrow face is preferably formed on a thin plate 2 that is formed separately from the body of the knife blade and thereafter rigidly secured thereto by brazing, or otherwise. The body of the knife blade is formed with a handle shank 3, preferably offset and driven into a hand piece 4, of wood or other material that is a nonconductor or slow conductor of heat. The body of said blade is also formed with a longitudinal groove 5 that is open at the handle end, but terminates short of the point of the blade. This slot or channel 5 affords a seat that is adapted to receive and detachably hold the electrical heater shown in detail in Fig. 3. This electrical heater is made up of insulated wire coils or manifolds 6, preferably contained between parallel insulating strips 7, of mica or other suitable material which is a nonconductor of electricity. The terminals of the coils or manifolds 6 are connected to live wires 8, preferably covered with an insulating material 9 and extended longitudinally through the hand piece. Obviously, when the electric current is turned on through the wires 8, the coils or manifolds 6 will produce heat sufficient to keep the knife blade 1 at the desired proper temperature. By running the wires through the hand piece of the knife, they are held where they cannot interfere with the honey comb which is being cut by the knife. The electrical heater, for the purpose of repairs, or for other reasons, may be withdrawn from the knife blade whenever desired, but normally, it will be frictionally held in working position within the blade.

By reference to Fig. 3, it will be noted that the coils 6 at the point of the knife are wound closer than the remainder of the coils, in order to produce greater heat at the point of the knife, in order to increase the efficiency thereof.

What I claim is:—

A knife blade having a cutting edge, and provided with an electrical heater, whereby its body and edge may be kept at a desired temperature, the said heater being contained within the body of the said blade, and the said heater being arranged to produce the greatest heat near the point of said blade.

In testimony whereof I affix my signature in presence of two witnesses.

ORSON B. POORE.

Witnesses:
C. F. LUTZ,
WM. S. HARTLEY.